(12) United States Patent
Hattori

(10) Patent No.: US 8,574,700 B2
(45) Date of Patent: Nov. 5, 2013

(54) CARPET AND METHOD OF MANUFACTURE THEREFOR

(75) Inventor: Atsuhiro Hattori, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 329 days.

(21) Appl. No.: 12/408,124

(22) Filed: Mar. 20, 2009

(65) Prior Publication Data

US 2009/0304982 A1    Dec. 10, 2009

(30) Foreign Application Priority Data

Jun. 6, 2008 (JP) ................................ 2008-149883

(51) Int. Cl.
*B32B 33/00* (2006.01)
*B32B 37/00* (2006.01)

(52) U.S. Cl.
USPC ............................................. 428/95; 156/72

(58) Field of Classification Search
USPC ............................................. 428/95; 156/72
See application file for complete search history.

(56) References Cited

U.S. PATENT DOCUMENTS

| | | | | |
|---|---|---|---|---|
| 4,035,533 A | * | 7/1977 | Chambley | 428/95 |
| 4,069,361 A | * | 1/1978 | Kumar | 428/95 |
| 4,217,383 A | * | 8/1980 | Patterson et al. | 428/95 |
| 4,242,394 A | * | 12/1980 | Leib et al. | 428/95 |
| 4,705,706 A | * | 11/1987 | Avery | 428/17 |
| 5,380,574 A | * | 1/1995 | Katoh et al. | 428/92 |
| 5,445,860 A | * | 8/1995 | Bova | 428/87 |
| 5,612,113 A | * | 3/1997 | Irwin, Sr. | 428/95 |
| 5,962,101 A | * | 10/1999 | Irwin et al. | 428/92 |
| 6,475,592 B1 | * | 11/2002 | Irwin | 428/95 |
| 6,479,125 B1 | * | 11/2002 | Irwin, Sr. | 428/95 |
| 6,740,385 B2 | * | 5/2004 | Gardner et al. | 428/85 |
| 6,808,786 B2 | * | 10/2004 | Theiss | 428/95 |
| 6,866,912 B2 | * | 3/2005 | Higgins et al. | 428/95 |
| 7,160,599 B2 | * | 1/2007 | Hartman | 428/95 |
| 7,364,634 B1 | * | 4/2008 | Irwin, Sr. | 156/72 |
| 7,594,975 B2 | * | 9/2009 | Hartman | 156/72 |
| 7,670,661 B2 | * | 3/2010 | Stroppiana | 428/95 |
| 2002/0172795 A1 | * | 11/2002 | Gardner et al. | 428/85 |
| 2003/0175474 A1 | * | 9/2003 | Higgins et al. | 428/95 |
| 2003/0175475 A1 | * | 9/2003 | Higgins et al. | 428/95 |
| 2004/0048036 A1 | * | 3/2004 | Nakasuji et al. | 428/95 |

(Continued)

FOREIGN PATENT DOCUMENTS

JP  55-000166  1/1980
JP  81038211 B * 9/1981

(Continued)

OTHER PUBLICATIONS

English language Abstract and translation of JP 2005-334435 A (Dec. 8, 2005).

(Continued)

*Primary Examiner* — Cheryl Juska
(74) *Attorney, Agent, or Firm* — Greenblum & Bernstein, P.L.C.

(57) ABSTRACT

A carpet according to the present invention includes: a first air-impermeable layer (surface layer), a sound absorbent layer provided on a reverse side of the first air-impermeable layer, and a second air-impermeable layer (backing material layer) provided on a reverse side of the sound absorbent layer. In the carpet, a pile yarn is implanted through the first air-impermeable layer and the sound absorbent layer.

8 Claims, 6 Drawing Sheets

(56) References Cited

U.S. PATENT DOCUMENTS

| | | |
|---|---|---|
| 2004/0151870 A1* | 8/2004 | Theiss .............................. 428/95 |
| 2005/0233107 A1* | 10/2005 | Hartman .......................... 428/95 |
| 2006/0003142 A1 | 1/2006 | Shimizu et al. |
| 2007/0122586 A1* | 5/2007 | Hartman .......................... 428/95 |
| 2007/0178794 A1* | 8/2007 | Nishio et al. .................. 442/394 |
| 2008/0149419 A1 | 6/2008 | Shimizu et al. |

FOREIGN PATENT DOCUMENTS

| | | | |
|---|---|---|---|
| JP | 58-066343 | | 5/1983 |
| JP | 59-178180 | | 11/1984 |
| JP | 11241308 | A * | 9/1999 |
| JP | 2004-105458 | A | 4/2004 |
| JP | 2004-168181 | | 6/2004 |
| JP | 2005-001403 | | 1/2005 |
| JP | 2005-334435 | A | 12/2005 |

OTHER PUBLICATIONS

English language Abstract and translation of JP 2004-105458 A (Apr. 8, 2004).

Japan Office Action in Japanese Patent Applicatin No. 2008-149883, dated Dec. 4, 2012, along with an English translation thereof.

* cited by examiner

PRIOR ART

CARPET AND METHOD OF MANUFACTURE THEREFOR

INCORPORATION BY REFERENCE

The present application claims priority under 35 U.S.C. §119 of Japanese Patent Application No. 2008-149883, filed on Jun. 6, 2008, the disclosure of which is expressly incorporated by reference herein in its entirety.

BACKGROUND OF THE INVENTION

1. Field of the Invention

The present invention relates to a carpet and a method of manufacture therefor. More specifically, the present invention relates to a carpet and a method of manufacture therefor that are capable of improving sound absorbability and productivity.

2. Description of the Related Art

As a carpet used for a vehicle such as an automobile, a variety of carpets have been developed that provide sound absorbing or insulating functions which insulate noise from outside the vehicle cabin as well as absorb sound within the vehicle cabin.

An example of a carpet according to a related art providing such sound absorbing or insulating functions has been proposed and is shown in FIG. 6. In this example, a carpet 108 is formed by laminating a surface base material layer implanted with a pile yarn 109, a surface latex layer 111 having minute holes, a PE powder layer 112 that serves as an adhesive layer, a sound absorbent layer 113 made from non-woven fabric and an air-impermeable backing material layer 114. As a result, sound from outside the vehicle cabin is blocked out by the backing material layer 114, and at the same time sound from within the vehicle cabin passes through the surface basic material layer 110, the surface latex layer 111 and the PE powder layer 112 and is absorbed in the absorbent non-woven fabric layer 113.

An example of a method of manufacture for the carpet 108 is shown in FIGS. 7A to 7F. In the method employed in this example, a non-woven fabric 115 is made into sheet form by a needle punch 116 (FIG. 7A), which is then heated and hardened to obtain the sound absorbent non-woven fabric layer 113 (FIG. 7B). Meanwhile, the pile yarn 109 is implanted into the surface base material layer 110 using a tufting machine (FIG. 7C), on a reverse side of which, latex 117 is applied and then heated to form the surface latex layer 111 (FIG. 7D). A PE powder 118 is applied to the surface latex layer 111 and then heated to form the PE powder layer 112, and practically simultaneously, the sound absorbent non-woven fabric layer 113 is adhered thereon (FIG. 7E). Finally, a T die laminate process is applied to a reverse side of the sound absorbent non-woven fabric layer 113 to form the backing material layer 114 (FIG. 7F).

As shown in FIG. 8, a carpet according to another related art providing such sound absorbing or insulating functions has been known. As shown, a carpet 100 is formed by laminating a surface material layer 101, an adhesive film layer 102, a sound absorbent non-woven fabric layer 103 and a resin layer 104 (see Patent Document 1 for an example). Within which, the surface material layer 101 includes a base fabric 105, which is implanted with pile yarn 106, and a pre-coated layer 107, which is air-permeable through a pre-coating treatment, and applied on an undersurface of the base fabric 105. Also, the adhesive film layer 102 is air-permeable due to a plurality of minute holes formed by the fiber of the sound absorbent non-woven fabric layer 103. Thus, sound from outside of the vehicle cabin is blocked by the resin layer 104, and at the same time, sound from within the vehicle cabin can pass through the surface material layer 101 and the adhesive film layer 102, and is then absorbed in the sound absorbent non-woven fabric layer 103.

Furthermore, as shown in FIGS. 9A and 9B, a carpet according to yet another related art providing such sound absorbing or insulating functions has been known. As shown, a carpet is formed by laminating a plastic foam sheet 119, a reinforcement base fabric 120 and a fiber assembly sheet 121. From a side of the fiber assembly sheet 121, a pile yarn 122 is implanted through all layers 121, 120 and 119 for penetration. On a reverse side of the fiber assembly sheet 121, an emulsion resin is applied (see Patent Document 2 for an example). Thus, sound from outside the vehicle cabin is blocked by the fiber assembly sheet 121, and at the same time, sound from within the vehicle cabin is absorbed by the plastic foam sheet 119, which serves as a sound absorbing layer.

Patent Document 1: Japanese Patent Application Publication No. JP-A-2005-334435

Patent Document 2: Japanese Patent Application Publication No. JP-A-2004-105458

However, the carpet 108 of the related art involves a large number of production processes (6 processes) and thus a low level of productivity. In addition, its sound absorbability needs to be further improved.

In addition, the carpet 100 of Patent Document 1 has minute holes formed in the adhesive film layer 102 to enable penetration through to the fiber of the sound absorbent non-woven fabric layer 103. However, there is no control over the size, the number, the arrangement or the like of the holes. It is possible to consider solving this by opening holes in the adhesive film layer 102. However, this would result in increased manufacturing processes and thus lower productivity.

Also, referring to the carpet 123 of Patent Document 2, the plastic foam sheet 119 that serves as the sound absorbent layer is exposed on the surface. This means that although sound enters from the surface side, it is discharged before being dampened, which results in an extremely low level of sound absorbability.

SUMMARY OF THE INVENTION

The present invention is devised to resolve the problems described above, and it is an object of the present invention to provide a carpet and a method of manufacture therefor that are capable of improving sound absorbability and productivity.

The present invention is as follows.

1. A carpet comprising:

a first air-impermeable layer;

a sound absorbent layer provided on a reverse side of said first air-impermeable layer; and a second air-impermeable layer provided on a reverse side of said sound absorbent layer, wherein a pile yarn is implanted through said first air-impermeable layer and said sound absorbent layer.

2. The carpet according to 1. above, further comprising:

a surface base material layer provided on a surface side of said first air-impermeable layer, wherein said pile yarn is implanted through said surface base material layer, said first air-impermeable layer and said sound absorbent layer.

3. The carpet according to 1. above, wherein said pile yarn projects out in a U shape at the reverse side of said sound absorbent layer.

4. The carpet according to 2. above, wherein said pile yarn projects out in a U shape at the reverse side of said sound absorbent layer.

5. The carpet according to 1. above, wherein a fineness of a non-woven fabric fiber that forms said sound absorbent layer is from 2.2 to 17 decitex.

6. The carpet according to 2. above, wherein a fineness of a non-woven fabric fiber that forms said sound absorbent layer is from 2.2 to 17 decitex.

7. The carpet according to 3. above, wherein a fineness of a non-woven fabric fiber that forms said sound absorbent layer is from 2.2 to 17 decitex.

8. The carpet according to 4. above, wherein a fineness of a non-woven fabric fiber that forms said sound absorbent layer is from 2.2 to 17 decitex.

9. A method of manufacture for the carpet according to 1. above, comprising:

a first step of laminating said first air-impermeable layer and said sound absorbent layer, and implanting said pile yarn from a side of said sound absorbent layer through said sound absorbent layer and said first air-impermeable layer; and a second step of laminating said second air-impermeable layer on the reverse side of said sound absorbent layer in which said pile yarn is implanted.

In the carpet according to the present invention, the pile yarn penetrates the first air-impermeable layer and the sound absorbent layer. In relation to the sound absorbent layer, as the first air-impermeable layer is provided on the surface side and the second air-impermeable layer is provided on the reverse side, sound from the surface side of the first air-impermeable layer is transmitted via the pile yarn to the sound absorbent layer. As a result, a large portion of the sound absorbed into the sound absorbent layer is retained therein and dampened. Accordingly, sound absorbability can be improved. Also, compared to a related art such as that having a sound absorbent layer adhered to a surface layer implanted with a pile yarn or that having a process of opening holes in an air-impermeable layer, the present invention can reduce the manufacturing processes and improve productivity.

When the carpet includes the surface base material layer provided on the surface side of the first air-impermeable layer and the pile yarn is implanted through the surface base material layer, the first air-impermeable layer and the sound absorbent layer, it is possible to improve formability and durability. Also, as the surface base material layer supports the first air-impermeable layer, implanting of the pile yarn is easy.

In addition, when the pile yarn projects out of the reverse side of the sound absorbent layer in a U shape, it is easy for the material that constitutes the second air-impermeable layer to bind with the projected portion. Due to the second air-impermeable layer, the pile yarn is fixed stronger.

In addition, when the fineness of the non-woven fabric fiber that structures the sound absorbent layer is from 2.2 to 17 decitex, this means that the fiber structure is comparatively thick. This maintains the thickness of the sound absorbent layer and consequently conserves the sound absorbability. This also ensures that there is not excessive resistance when the pile yarn is penetrated therethrough and thus it is possible to further improve productivity.

In the method of manufacture for a carpet according to the present invention, the pile yarn penetrates the first air-impermeable layer and sound absorbent layer. On the surface side and the reverse side of the sound absorbent layer the first air-impermeable layer and second air-impermeable layer are positioned respectively. Accordingly, sound on the surface side of the first air-impermeable layer is transmitted via the pile yarn to the sound absorbent layer. A large proportion of the sound absorbed into the sound absorbent layer is retained therein and dampened. As a result, it is possible to improve sound absorbability. Also, compared to a related art such as that having a sound absorbent layer adhered to a surface layer implanted with a pile yarn or that having a process of opening holes in an air-impermeable layer, it is possible to reduce manufacturing processes and improve productivity.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 2A to 2C are schematic diagrams of a method of manufacture for a carpet, in which FIG. 2A shows a process for obtaining a sound absorbent layer, FIG. 2B shows a process for implanting a pile yarn, and FIG. 2C shows a process for making a backing material layer;

FIGS. 7A to 7F are schematic diagrams of a method of manufacture for a carpet, in which FIG. 7A shows a process of needle punching non-woven fabric, FIG. 7B shows a process for obtaining a sound absorbent non-woven fabric layer, FIG. 7C shows a process of implanting a pile yarn, FIG. 7D shows a process of forming a surface latex layer, FIG. 7E shows a process of adhering together the surface latex layer and a sound absorbent non-woven fabric layer, and FIG. 7F shows a process of forming a backing material layer 114;

FIGS. 9A and 9B are diagrams of a carpet according to yet another related art, in which FIG. 9A shows processes of manufacture, and FIG. 9B shows a vertical section diagram.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Carpet

A carpet according to a first exemplary form of the present invention includes a first air-impermeable layer, a sound absorbent layer and a second air-impermeable layer, which are described below. The carpet can also include a surface base material layer, which is described below.

Figure 3:
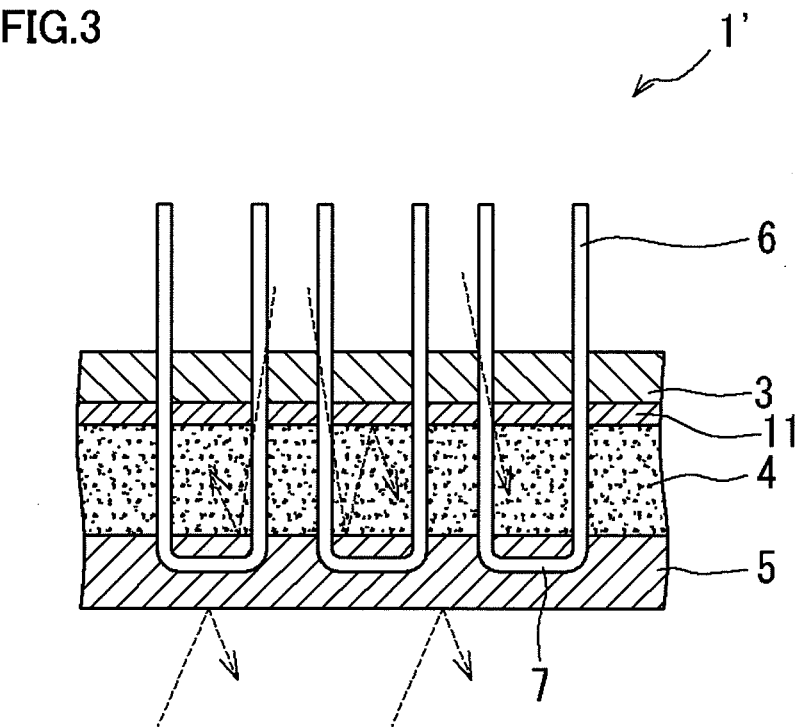
FIG. 3 is a vertical section diagram of a carpet according to another embodiment.

A structure, size, shape, material or the like of the first air-impermeable layer are not particularly limited. When the carpet does not include the surface base material layer, the first air-impermeable layer can, for example, be a resin sheet made from polyethylene or the like (see FIG. 3). In this case, usually an adhesive layer can be provided between the resin sheet and the sound absorbent layer to adhere both layers together.

The above-mentioned sound absorbent layer is not particularly limited in terms of structure, size, shape, material or the like, provided that the sound absorbent layer is disposed at a reverse side of the first air-impermeable layer. The sound absorbent layer can for example be made of non-woven fabric. Accordingly, it is possible to improve sound absorbability and at the same time create a low cost carpet. In this case, it is preferable that a fineness of a fiber that constitutes the non-woven fabric is from 2.2 to 17 decitex (particularly 6.6 to 11 decitex).

The above-mentioned second air-impermeable layer is not particularly limited in terms of structure, size, shape, material or the like, provided that the second impermeable layer is disposed at a reverse side of the sound absorbent layer. The second air-impermeable layer usually functions to block sound coming from a reverse side thereof.

A pile yarn is implanted through the first air-impermeable layer and the sound absorbent layer. The pile yarn can, for example, be a loop pile having loop-shaped ends, a cut pile having cut ends, or the like, or a combination of two or more types thereof. In addition, it is preferable that an end of the pile yarn at a side opposite to a surface side projects out of a reverse side of the sound absorbent layer in a U shape.

The above-mentioned surface base material layer is not particularly limited in terms of structure, size, shape, material or the like, provided that the surface base material layer is disposed at a surface side of the first air-impermeable layer. The pile yarn is implanted through the surface base material layer, the first air-impermeable layer and the sound absorbent layer. When the carpet includes the surface base material layer, the surface base material layer can be made of non-woven fabric and the first air-impermeable layer can be an adhesive film. Accordingly, the surface base material layer and the sound absorbent layer can be adhered without using another adhesive, thus reducing material costs and manufacturing processes and making it possible to further improve productivity.

2. Method of Manufacture for the Carpet

A method of manufacture for a carpet according to a second exemplary form of the present embodiment is a method of manufacture for the carpet according to the first exemplary form of the present embodiment, and includes: a first step of laminating the first air-impermeable layer and the sound absorbent layer and implanting the pile yarn from the sound absorbent layer side through the sound absorbent layer and the first air-impermeable layer; and a second step of laminating the second air-impermeable layer on the reverse side of the sound absorbent layer implanted with the pile yarn.

In the first step, for example, the surface base material layer, the first air-impermeable layer and the sound absorbent layer are laminated, and the pile yarn is implanted from the sound absorbent layer side through the sound absorbent layer, the first air-impermeable layer and the surface base material layer. Accordingly, a carpet can be created having the surface base material layer.

Hereinafter, an embodiment of the present invention will be described in detail with reference to the drawings. The embodiment represents an example of a carpet according to the present invention that is used in automobiles.

(1) Carpet Structure

Figure 1:
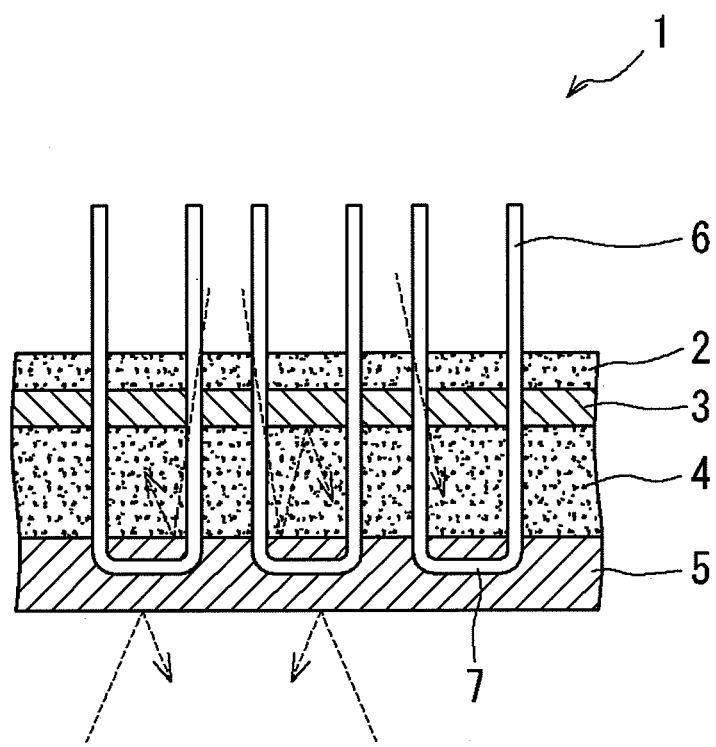
FIG. 1 is a vertical section diagram of a carpet according to an embodiment of the present invention.

As shown in FIG. 1, a carpet 1 according to the present embodiment is formed by laminating a surface base material layer 2, a surface layer 3 (this represents the first air-impermeable layer in the present invention), a sound absorbent layer 4 and a backing material layer 5 (this represents the second air-impermeable layer in the present invention). Also, a pile yarn 6 is implanted through the surface base material layer 2, the surface layer 3 and the sound absorbent layer 4.

The surface base material layer 2 is made from a polyester spunbonded non-woven fabric having air-permeable characteristics. The surface layer 3 is an adhesive film made of low-density polyethylene. This surface layer 3 adheres the surface base material layer 2 and the sound absorbent layer 4 by thermal fusion. The sound absorbent layer 4 is a needle-punched non-woven fabric made from polyester that possesses air-permeable characteristics. The fineness of the non-woven fabric that constitutes the sound absorbent layer 4 is approximately 15 decitex. The backing material layer is made of low-density polyethylene. The pile yarn 6 is made of colored polyamide. This pile yarn 6 has an end portion at a side opposite to the surface side, which projects in a U-shape beyond the reverse side of the sound absorbent layer into the backing material layer 5 and forms a projected portion 7. Furthermore, the pile yarn is a cut pile in which an end portion at the surface side is cut.

(2) Operation of the Carpet

The following is an explanation of a method of manufacture for the carpet 1.

Figure 2A:
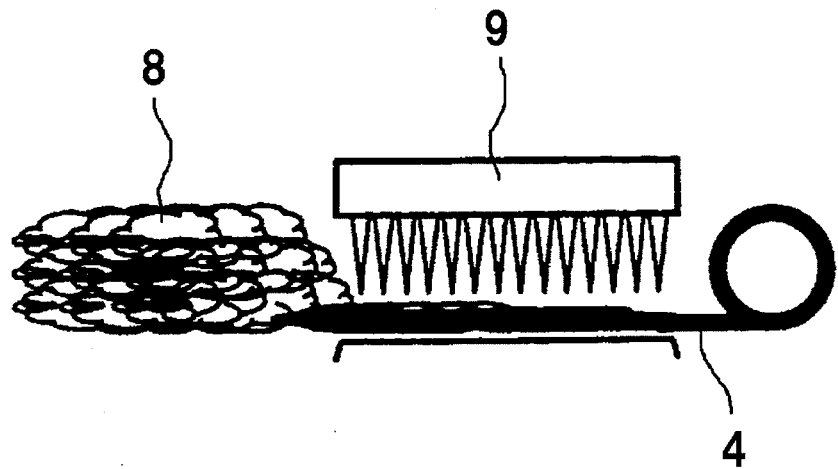
Figure 2B:
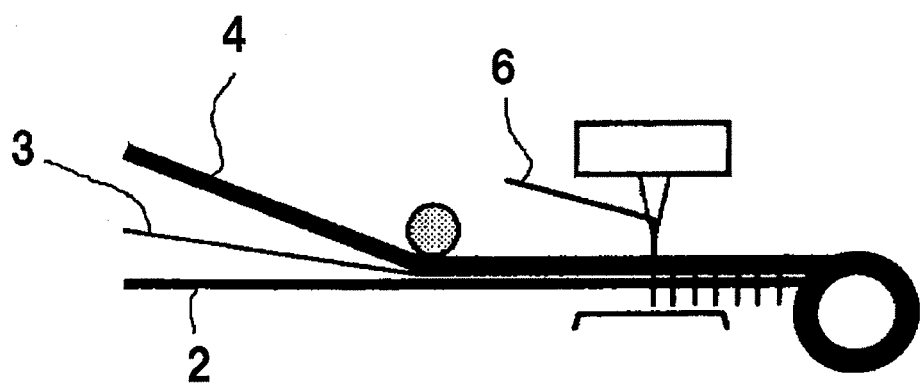
Figure 2C:
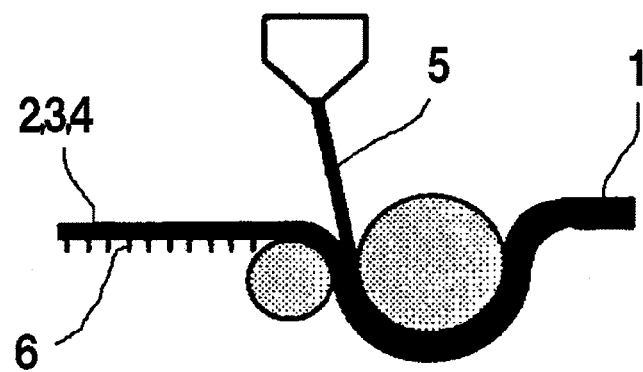

As shown in FIGS. 2A to 2C, a non-woven fabric 8 is made into sheet form by a needle punch 9 to create the sound absorbent layer 4 (FIG. 2A). Then, the surface base material layer 2, the surface layer 3 and the sound absorbent layer 4 are laminated in that order and the pile yarn is implanted from the sound absorbent layer side through all of these layers 4, 3 and 2 using a tufting machine to create pile on the surface base material layer 2 (FIG. 2B). At this point, the end portion of the pile yarn 6 on the side opposite to the surface side is not in close contact with the sound absorbent layer 4, but is slightly raised and projecting in a U-shape, as in the projected portion 7 (see FIG. 1). Then, the backing material layer 5 is formed by applying a T die laminate process to the reverse side of the sound absorbent layer 4 (FIG. 2C). At this point, the backing material binds with the projected portion 7 of the pile yarn 6, fixing the pile yarn 6 in place so that it cannot come out. Accordingly, the carpet 1 is formed.

The following is an explanation of the sound absorbing and sound insulating operations of the carpet 1.

As shown in FIG. 1, sound from within the vehicle cabin is received by a surface of the carpet 1. This sound is transmitted via the pile yarn 6 through the surface layer 3 to the sound absorbent layer 4. Sound that enters the sound absorbent layer 4 is deflected by the air-impermeable surface layer 3 and the backing material layer 5, and so is retained in the sound absorbent layer 4. In the sound absorbent layer 4, which is made of non-woven fabric, the sound is absorbed and dampened.

Sound from outside the vehicle cabin is received by the reverse side of the carpet 1 and is deflected by the backing material layer 5.

(3) Effects of the Embodiment

According to the present embodiment, the pile yarn 6 penetrates through the surface base material layer 2, the surface layer 3 and the sound absorbent layer 4. The sound absorbent layer 4 is laminated on its surface side and reverse side by the surface layer 3 and the backing material layer 5, which are air-impermeable. Therefore, sound from within the vehicle cabin is transmitted via the pile yarn 6 to the sound absorbent layer 4, where it is absorbed. A large portion of the sound absorbed in the sound absorbent layer 4 is retained and dampened. Accordingly, sound absorbability can be improved. Also, compared to related art such as that having a sound absorbent layer adhered to a surface layer implanted with a pile yarn or that having a process of opening holes in an air-impermeable layer, the present embodiment is able to reduce the manufacturing processes and improve productivity. The surface base material layer 2 improves formability and durability. Moreover, since the surface layer 3 is supported by the surface base material layer 2, the pile yarn 6 is easy to implant.

In addition, the projected portion 7 in the present embodiment is the end portion of the pile yarn 6 at the side opposite to the surface side and projects in a U shape at the reverse side of the sound absorbent layer 4. Therefore, the projected portion 7 is easy to bind in the backing material and consequently makes it possible for the pile yarn 6 to be fixed stronger in the backing material layer 5. As a result, it is possible to more reliably prevent the pile yarn 6 from coming out.

In addition, since the surface layer 3 in the present embodiment is an adhesive film, it is possible to adhere the surface base material layer 2 and the sound absorbent layer 4 without using any other adhesive. Therefore, the material costs and manufacturing processes related to the adhesion of layers 2 and 4 are reduced and the productivity of the carpet 1 can be improved.

Also, in the present embodiment, the fineness of the non-woven fabric fiber that constitutes the sound absorbent layer 4 is approximately 15 decitex, which is comparatively coarse. This coarseness maintains the thickness of the sound absorbent layer and consequently conserves its sound absorbability. This also ensures that there is not excessive resistance when penetrating the pile yarn 6 through the layers and can further improve productivity. Furthermore, one portion of the non-woven fabric fiber that constitutes the sound absorbent layer 4 employs thermal fusion bonding fiber. This can improve dimensional stability, shape retention and rigidity during the three-dimensional forming processes.

Note that the present invention is not limited to the embodiment described above, and various modifications can be made within the scope of the invention in accordance with the objective and usage thereof. Specifically, the above embodiment represents the carpet 1 having the surface base material layer 2 on the surface side of the surface layer 3. However, the present invention is not limited to this, and a carpet 1' can be structured without the surface base material layer 2, as shown in the example in FIG. 3. In this case, if the surface layer 3 is a plastic sheet made of a material such as polyethylene for example, the surface layer 3 and the sound absorbent layer 4 can be adhered using an adhesive layer 11 consisting of PE powder or the like.

It is also possible to make the surface base material layer 2 air-impermeable, or in a state very close to impermeability.

In addition, in the present embodiment the surface layer 3 is an adhesive film. However, not to be limited to this, it is possible, for example, for the surface layer 3 to be a layer possessing no adhesive effects. In which case, the surface layer 3, the surface base material layer 2 and the sound absorbent layer 4 can be adhered by separate adhesive layers consisting of PE powder or the like.

Furthermore, the present embodiment presents a cut pile that has been cut at the end. However, not to be limited to this, it is possible to employ loop pile with loop-shaped ends.

The following is a detailed explanation of an example 1 and a comparative example 1 for the study of carpet sound absorbability and sound insulation.

Example 1

Included in the carpet 1 shown in FIG. 1 were: the surface base material layer 2 made of spunbonded non-woven fabric at a weight of 100 g/m$^2$; the surface layer 3 made of low-density PE at a weight of 30 g/m$^2$; the sound absorbent layer 4 made of needle-punched non-woven fabric at a weight of 300 g/m$^2$; the backing material layer 5 made of a low-density PE at a weight of 400 g/m$^2$; and the pile yarn 6 made of a colored polyamide at a weight of 420 g/m$^2$; in total 1250 g/m$^2$.

Comparative Example 1

Figure 6:
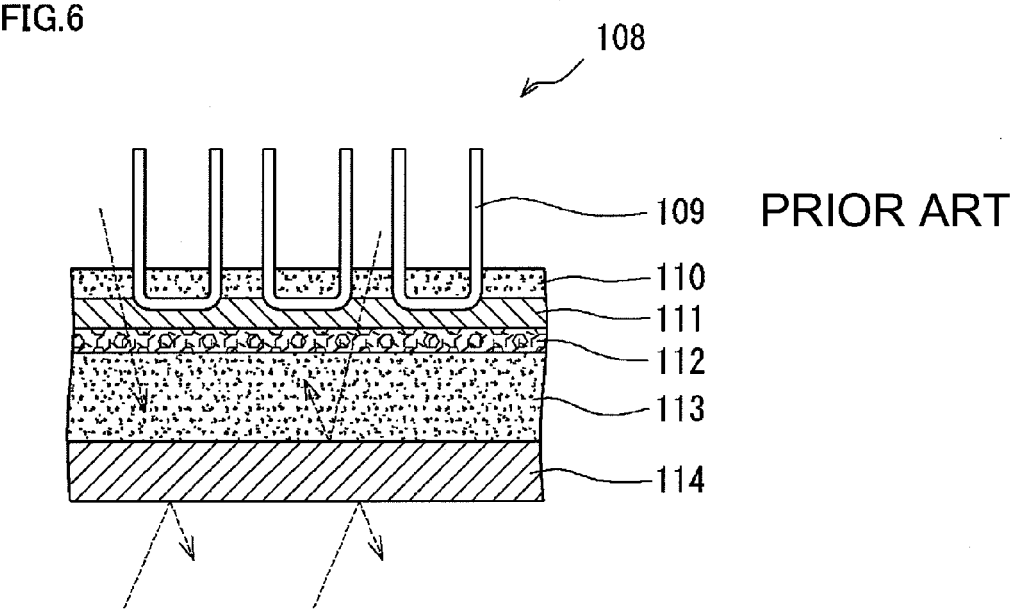
FIG. 6 shows a vertical section diagram of a carpet according to a related art.
Figure 7:
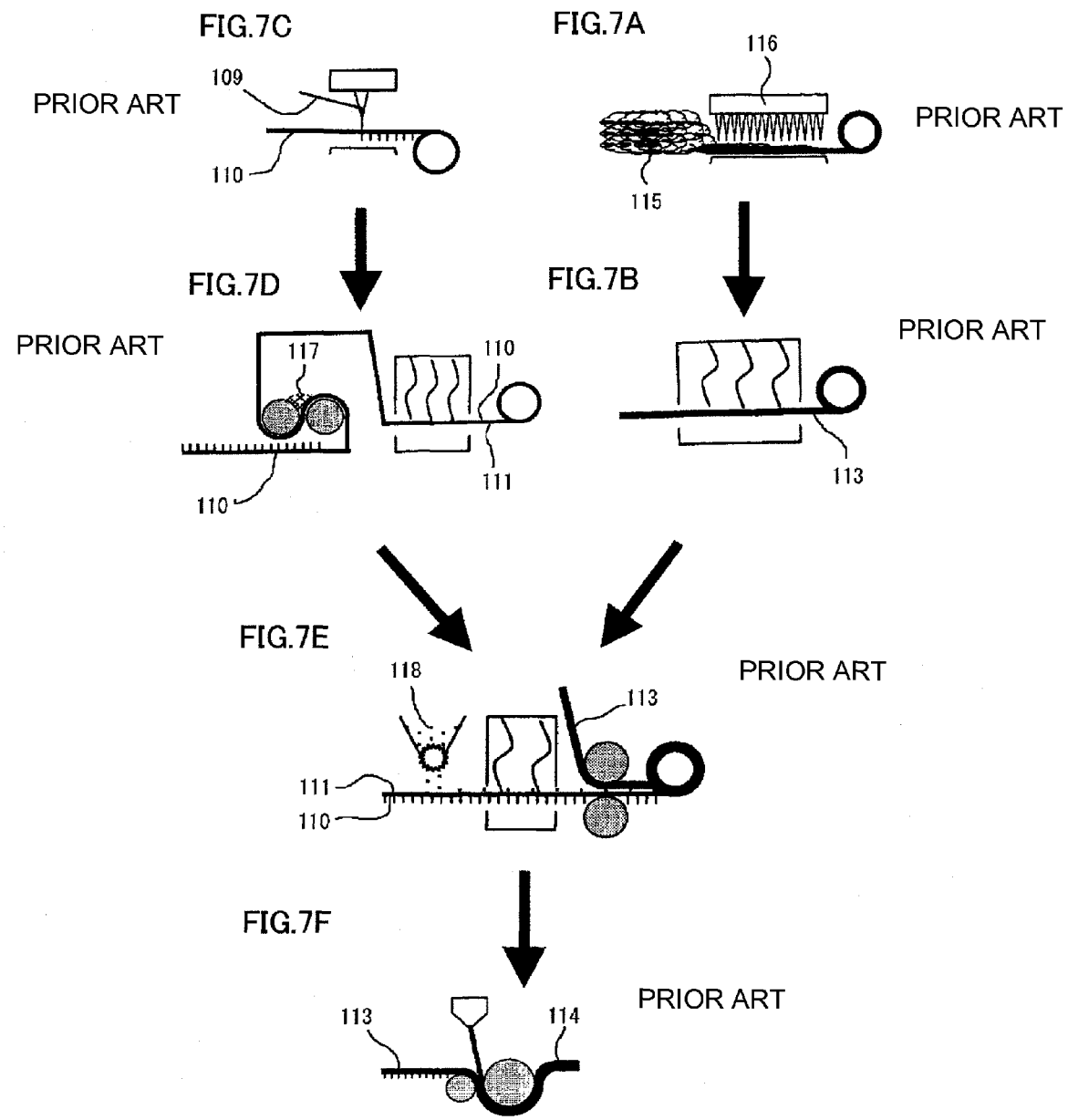
Figure 8:
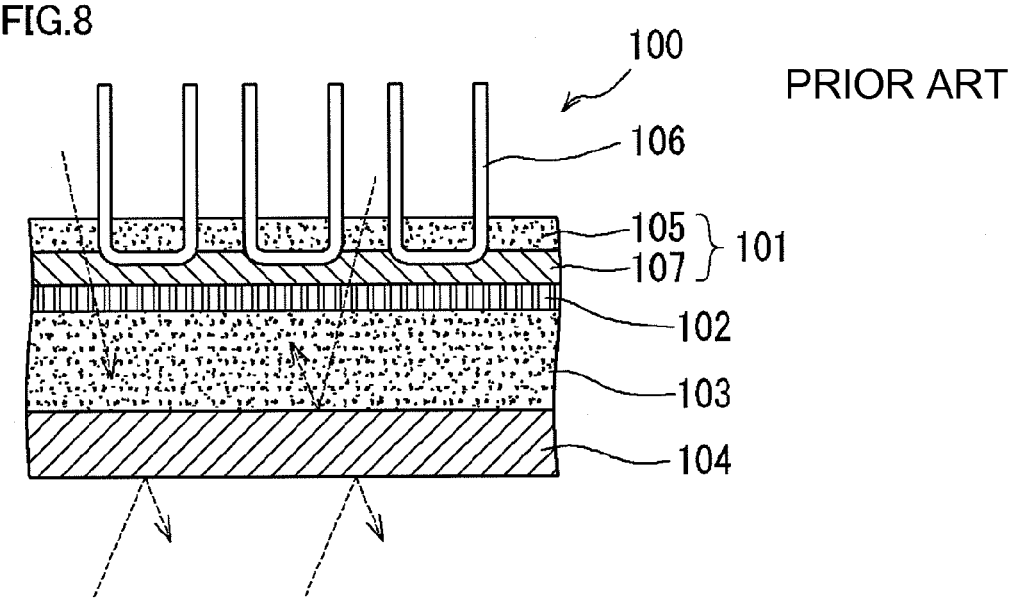
FIG. 8 is a vertical section diagram of a carpet according to another related art.
Figure 9A:
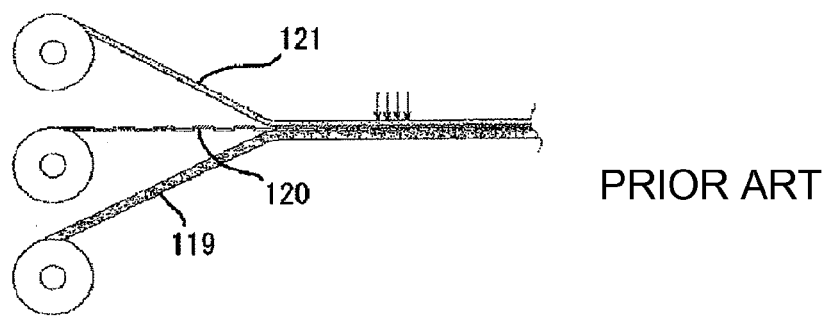
Figure 9B:
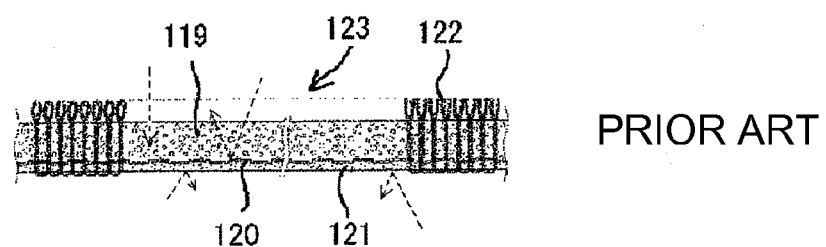

Included in the carpet 108 shown in FIG. 6 were: the surface base material layer 110 made of spunbonded non-woven fabric at a weight of 100 g/m$^2$; the surface latex layer 111 made of latex at a weight of 50 g/m$^2$; the PE powder layer 112 at a weight of 200 g/m$^2$; the sound absorbent non-woven fabric layer 113 made of needle-punched non-woven fabric at a weight of 300 g/m$^2$; the backing material layer 114 made of a low-density PE at a weight of 250 g/m$^2$, and the pile yarn 109 made of a colored polyamide at a weight of 350 g/m$^2$; in total 1250 g/m$^2$.

Figure 4:
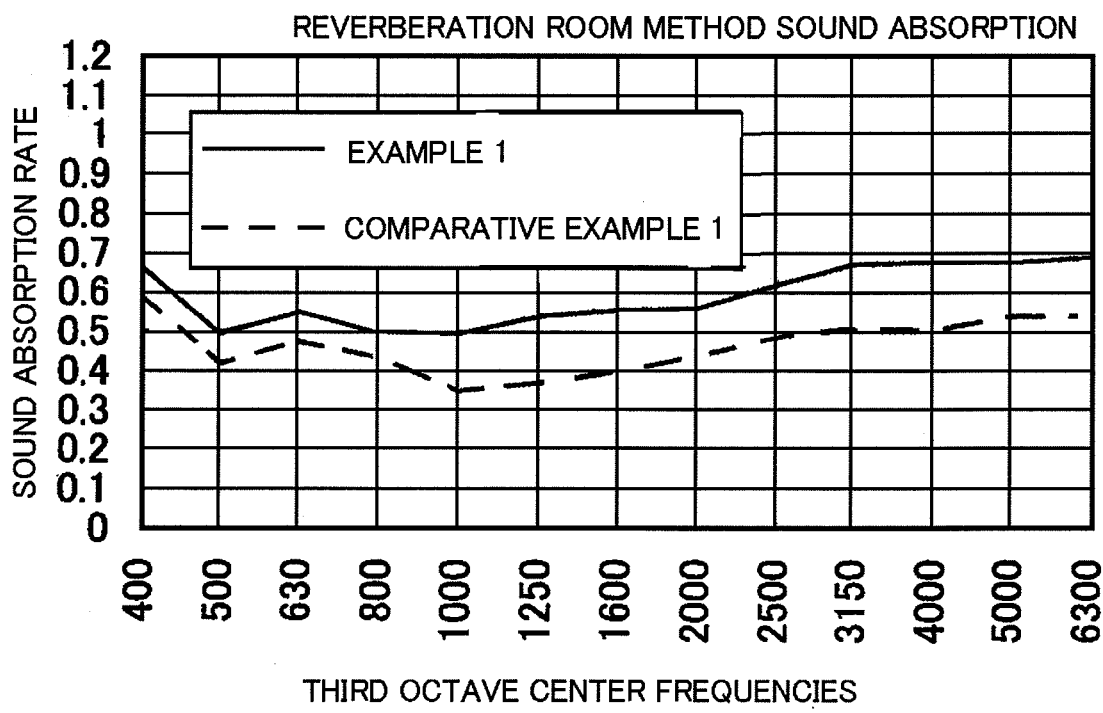
FIG. 4 is a graph showing the frequency characteristics of third octave band sound absorption for an example 1 and a comparative example 1.

Regarding the example 1 and the comparative example 1, the frequency characteristics of third octave band sound absorption rates were measured. Sound absorption rate measurements were carried out according to JIS A 1416 (reverberation room sound absorption). The room in which measuring was carried out was equipped with one speaker and three microphones and an object for measurement was positioned on the floor of the room. As the results in FIG. 4 show, the carpet 1 according to the example 1 achieved a higher sound absorption rate across all wave frequencies than the carpet 108 according to comparative example 1. Accordingly, this confirmed that the carpet 1 according to the example 1 could absorb sound from within the vehicle cabin more effectively than the carpet 108 according to the related art.

Figure 5:
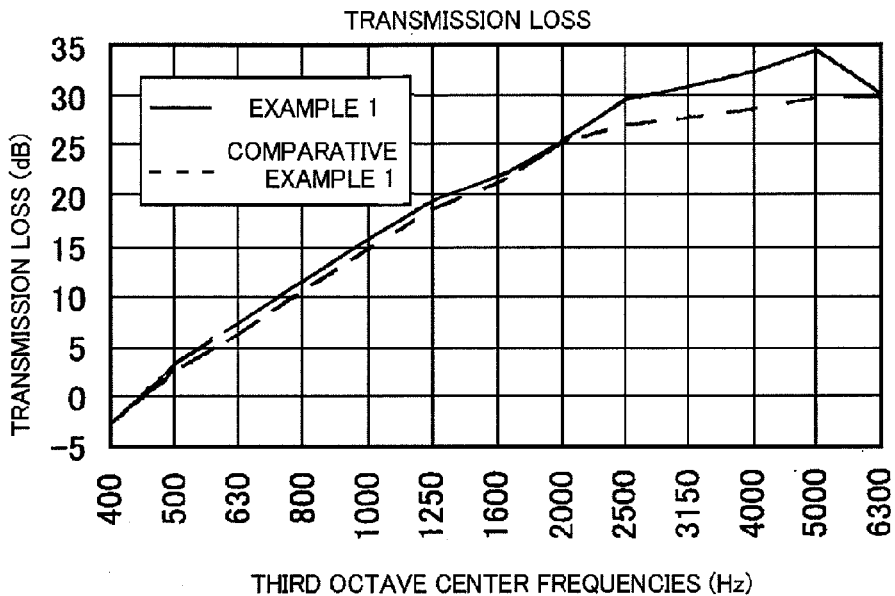
FIG. 5 is a graph showing the wave frequency characteristics of third octave band transmission loss for the example 1 and the comparative example 1.

Next, the wave frequency characteristics of third octave band transmission loss were measured. Transmission loss measurements were carried out according to JIS A 1409. The room in which measuring was carried out was partitioned into two, one side equipped with one speaker and three microphones and the other side equipped with three microphones. An object for measurement was positioned on the dividing wall. As the results in FIG. 5 show, the carpet 1 according to the example 1 achieved a higher transmission loss than the carpet 108 according to comparative example 1, especially for high pitch sounds. Accordingly, this confirmed that the carpet 1 according to the example 1 can block sound from outside the vehicle cabin more effectively than the carpet 108 according to the related art.

The present invention can be used widely as a sound absorbing and sound insulating carpet. In particular, it is most suitably used as a carpet for vehicles such as automobiles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A carpet, comprising:
a first layer being a resin sheet and comprising a first material, said first material being air-impermeable prior to being implanted with a pile yarn;
a second layer comprising a second material and provided on a reverse side of said first layer, said second material being sound absorbent;
an adhesive layer provided between said first layer and said second layer for adhering said first layer and said second layer; and
a third layer comprising a third material and provided on a reverse side of said second layer, said third material being air-impermeable, wherein
said pile yarn is implanted through said first layer, said adhesive layer, and said second layer and not through said third layer,
said second layer is a needle-punched non-woven fabric made from polyester,
a fineness of a non-woven fabric fiber of said second layer is from 2.2 to 17 decitex for maintaining said thickness of said second layer.

2. The carpet according to claim 1, further comprising:
a fourth layer comprising a surface base material provided on a surface side of said first layer, wherein
said pile yarn penetrates through said fourth layer.

3. The carpet according to claim 1, wherein said pile yarn projects out of said second layer in a U shape at the reverse side of said second layer.

4. The carpet according to claim 2, wherein said pile yarn projects out of said second layer in a U shape at the reverse side of said second layer.

5. A method of manufacture for the carpet according to claim 1, comprising:
layering said first layer, said adhesive layer, and said second layer, and implanting said pile yarn from the reverse side of said second layer through said second layer, said adhesive layer, and said first layer; and
layering said third layer on the reverse side of said second layer in which said pile yarn is implanted.

6. A carpet, comprising:
a first layer being a resin sheet and comprising a first material, said first material being air-impermeable prior to being implanted with a pile yarn;
a second layer comprising a second material and provided on a reverse side of said first layer, said second material being sound absorbent;
an adhesive layer provided between said first layer and said second layer for adhering said first layer and said second layer;
a third layer comprising a third material and provided on a reverse side of said second layer, said third material being air-impermeable; and
a fourth layer comprising a surface base material and provided on a surface side of said first layer, wherein
said pile yarn is implanted through said fourth layer, said first layer, said adhesive layer, and said second layer and not through said third layer,
said second layer is a needle-punched non-woven fabric made from polyester, and
a fineness of a non-woven fabric fiber of said second layer is from 2.2 to 17 decitex for maintaining said thickness of said second layer.

7. The carpet according to claim 6, wherein said pile yarn projects out of said second layer in a U shape at the reverse side of said second layer.

8. A method of manufacture for the carpet according to claim 6, comprising:
layering said fourth layer, said first layer, said adhesive layer, and said second layer, and implanting said pile yarn from the reverse side of said second layer through said second layer, said adhesive layer, said first layer, and said fourth layer; and
layering said third layer on the reverse side of said second layer in which said pile yarn is implanted.

* * * * *

UNITED STATES PATENT AND TRADEMARK OFFICE
CERTIFICATE OF CORRECTION

PATENT NO. : 8,574,700 B2
APPLICATION NO. : 12/408124
DATED : November 5, 2013
INVENTOR(S) : A. Hattori It is certified that error appears in the above-identified patent and that said Letters Patent is hereby corrected as shown below:

On the Title Page:

References Cited, Page 2 (Column 2, line 9) of the printed patent, please change "Applicatin" to --Application--.

In the Claims:

At Column 9, line 31 (claim 1, line 18) of the printed patent, please insert --and-- after "polyester,".

Signed and Sealed this
Seventeenth Day of June, 2014

Michelle K. Lee
*Deputy Director of the United States Patent and Trademark Office*